Sept. 9, 1924.
R. C. STUBBS
MEASURING DRUM
Filed Oct. 13, 1921
1,507,867
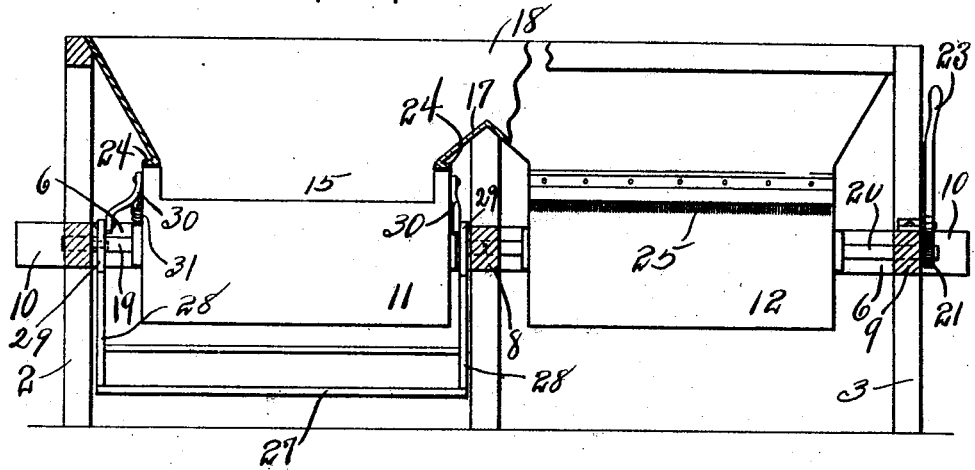
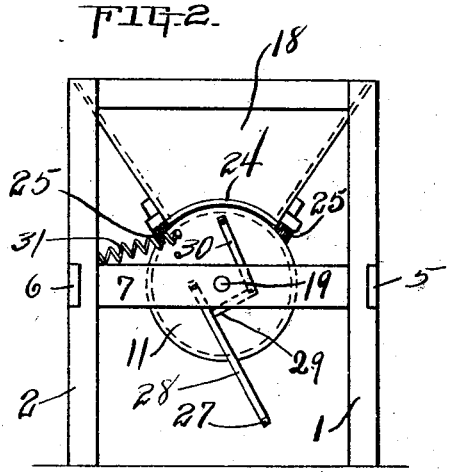
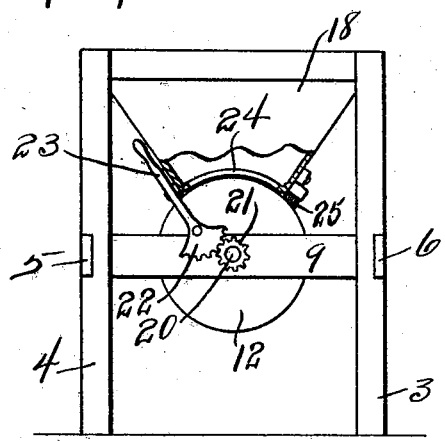
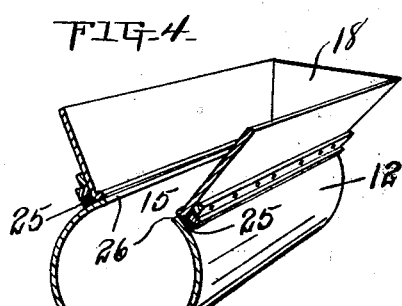
Inventor
ROBERT C. STUBBS.
By A. L. Jackson
Attorney Patented Sept. 9, 1924.

1,507,867

UNITED STATES PATENT OFFICE.

ROBERT C. STUBBS, OF DALLAS, TEXAS.

MEASURING DRUM.

Application filed October 13, 1921. Serial No. 507,409.

*To all whom it may concern:*

Be it known that I, ROBERT C. STUBBS, a citizen of the United States of America, residing at Dallas, in the county of Dallas and State of Texas, have invented certain new and useful Improvements in Measuring Drums, of which the following is a specification.

My invention relates to road or street building equipment and more particularly to measuring devices for securing uniform amounts of ingredients for making concrete or other material; and the object is to provide a simple measuring device for operation in connection with bins or hoppers which contain the material so that uniform amounts of ingredients will always be provided in the mixing of ingredients. The handling of sand, stone or pebbles, or cement has been largely accomplished by transporting such materials from the supply piles or heaps in wheelbarrows or trucks, the transporting device being loaded by workmen using shovels. Such handling of materials is not uniform for various reasons. The object is to provide a never failing means of mechanical measurement of ingredients, and such device as proposed for protection in such work has proved to be absolutely accurate and invaluable to the end that the exact proportions and amounts of each ingredient are insured in such manner that it would be impossible for a difference to be obtained in the volume of the different batches so measured. The same measuring device may be used for transporting the mixed concrete from the mixer to the street or road where it is laid so that the thickness of the concrete will be uniform. Other objects and advantages will be fully explained in the following description and the invention will be more particularly pointed out in the claims.

Reference is had to the accompanying drawings which form a part of this application.

Fig. 1 is a front elevation of two hoppers or bins and measuring drums therefor, partly in section. Fig. 2 is an end elevation of the left side of Fig. 1. Fig. 3 is an end elevation of the right side of Fig. 1. Fig. 4 is a section of a hopper and a measuring drum shown in perspective.

Similar characters of reference are used to indicate the same parts throughout the several views.

A portable bin or hopper is herein set forth, and it may be preferable to make a double bin or hopper because the two can be more economically constructed together than it would be to build two separate structures. An upright frame is provided with supports or posts 1, 2, 3, and 4 which are attached to longitudinal horizontal beams 5 and 6. The frame is completed by cross-beams 7, 8, and 9 which are attached to beams 5 and 6. The ends of the beams 5 and 6 may be extended to form handles 10 so that the device can be taken by two men and moved from place to place for locating adjacent to or near the material. A double hopper 18 is mounted on the frame and provided with a divider 17 at the central portion for directing material to the measuring drums or receptacles 11 and 12. The drums 11 and 12 are cylindrical structures with openings 15 in their upper sides to receive charges, each drum being independently operative. The drum 12 is provided with stub shafts 19 and 20 which are rigid therewith and which are journaled in the frame beams 8, and 9. A cog wheel 21 is rigid with the stub shaft 20 and a segmental cog 22 is mounted on the end of the frame and meshes with the cog wheel 21 and is provided with a handle 23 for operating the drum 12. By means of the handle 23, the drum can be revolved or rocked on its shafts to discharge a load or charge. The segmental cog 22 is made on a diameter large enough to make the wheel 21 turn twice as much as the cog 22 so that the handle 23 will not have to be moved so far. The parts 24 of the hopper or bin 18 which are next to the drum 12 are curved to prevent material from escaping at the ends of the bin. Both drums 11 and 12 have the same construction. The drums will deliver all the material which can be contained in the circular cavities in the bins. In order to make the bins deliver the same quantity each time, cut-offs are necessary on the sides of the hopper. These cut-offs consist of steel brushes 25. The steel brushes are yieldable and will cut off the material although the material contains pebbles or stones. A rigid cut-off would not do satisfactory service because the edge 26 of the drum would catch a stone or pebble against a rigid cut-off on the bottom of the hopper and be locked against movement. The yieldable cut-offs 25 are satisfactory. The hopper may be full of material but when the drum is turned to throw out a charge, the cut-offs 25 will hold back the material which cannot be inclosed in the drum so that only a drum full will be discharged and the same amount of material will be discharged each time. The portions of the drums not cut away to form the openings 15 will serve as bottoms or gates for the hoppers while the drums are performing their functions of delivering charges or loads.

The measuring drums may be operated automatically and mechanically. One drum has been shown provided with manually operated devices dumping the contents of the drum. The other drum 11 is shown provided with devices for automatically dumping the contents thereof. A trip 27 is connected to the ends of the drum 11. The trip 27 has arms 28 pivotally connected to the beams 7 and 8 and are provided with arms 29. The arms 29 are pivotally connected to pull rods or bars 30 and the bars 30 are pivotally connected to the ends of the drum 11. The pull bars 30 and the arms 29 and 28 are so proportioned that the bars 30 will move the drum 11 twice as much as the arms 28. The arms 28 will turn only one quarter of a turn on their pivots to revolve the drum 11 one half of a revolution. Two bars 27 are used instead of one bar because of the curvature of the wheels of the transporting vehicle. The vehicles are run under the drums and when the wheels strike the trip 27, the drums will be automatically revolved a half turn to discharge the charges. When the vehicle is withdrawn, the drum 11 will be automatically returned to filling position by springs 31. Both drums may be provided with such equipment or both provided with manually operated revolving devices. Various other changes in the sizes, construction and arrangement of the several parts may be made without departing from my invention.

What I claim is,—

1. A measuring drum comprising a supporting frame, a hopper mounted on said frame and provided with a discharge opening in the lower side thereof, two opposite walls of said hopper having flanged bearing recesses, a tubular receptacle provided with stub shafts journaled in said frame and having an opening normally registering with the opening in said hopper and having continuous peripheral surfaces cooperating with said bearing recesses, and means for revolving said receptacle to discharge a charge.

2. A measuring device comprising a supporting frame, a hopper mounted on said frame and provided with a discharge opening and curved flanged bearing members at the ends of said opening, a cylindrical delivering receptacle closed at the ends and having an opening normally registering with the opening in said hopper and having continuous peripheral surfaces engaging said flanged bearing members and revolubly mounted in said frame, a trip operatively connected with said cylindrical delivering receptacle and suspended below said receptacle in the path of a transporting device to be actuated thereby for automatically inverting said receptacle to discharge the contents, and means for moving said receptacle back to normal position.

3. A measuring device comprising a supporting frame, a hopper mounted on said frame and provided with a discharge opening, a tubular receptacle closed at both ends and having an opening registering normally with the opening in said hopper and journaled in said frame, said hopper having portions thereof curved about the end portions of said receptacle, and said receptacle having continuous peripheral surfaces co-operating with the curved portions of said hopper, yielding cut-offs composed of steel brushes on the outside of said hopper adjacent to and on both sides of the opening therein and cooperating with said receptacle, and means for revolving said receptacle.

In testimony whereof, I set my hand, this 8th day of October, 1921.

ROBERT C. STUBBS.